Nov. 16, 1926.  W. P. GARRETSON  1,607,454
RIM AND LOCK
Filed March 16, 1925   2 Sheets-Sheet 1
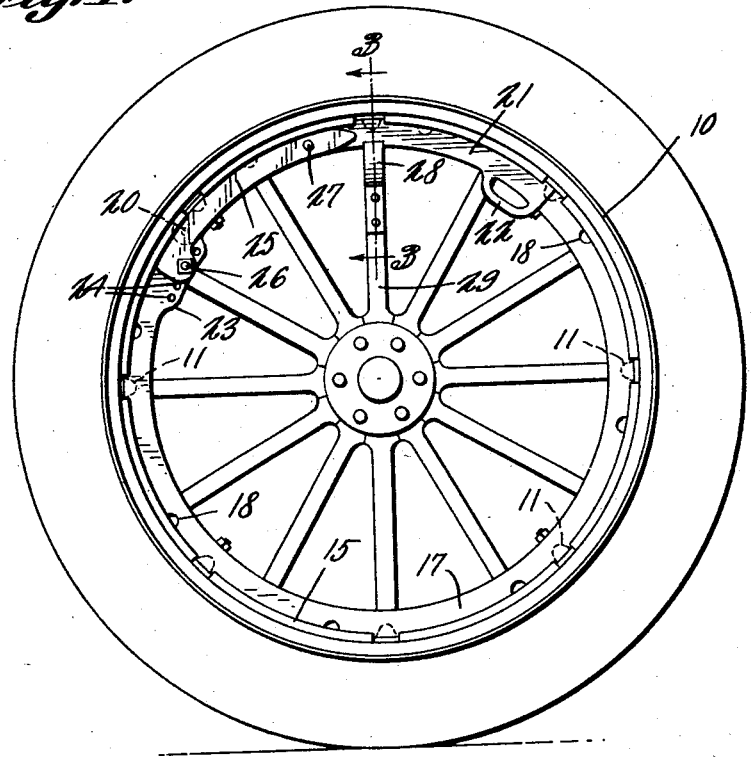
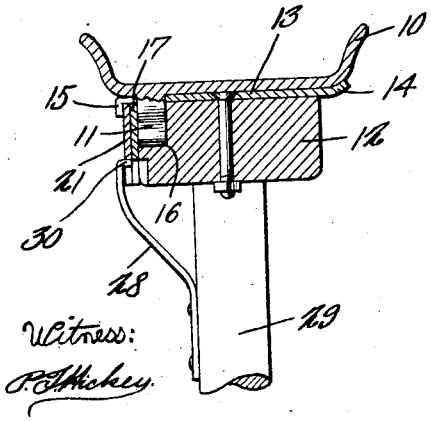
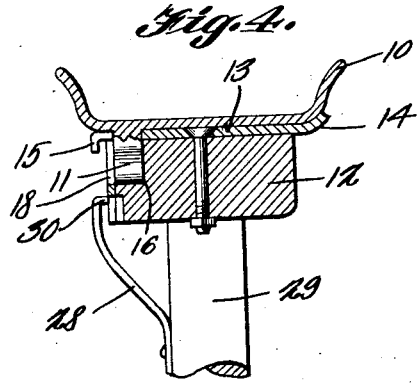

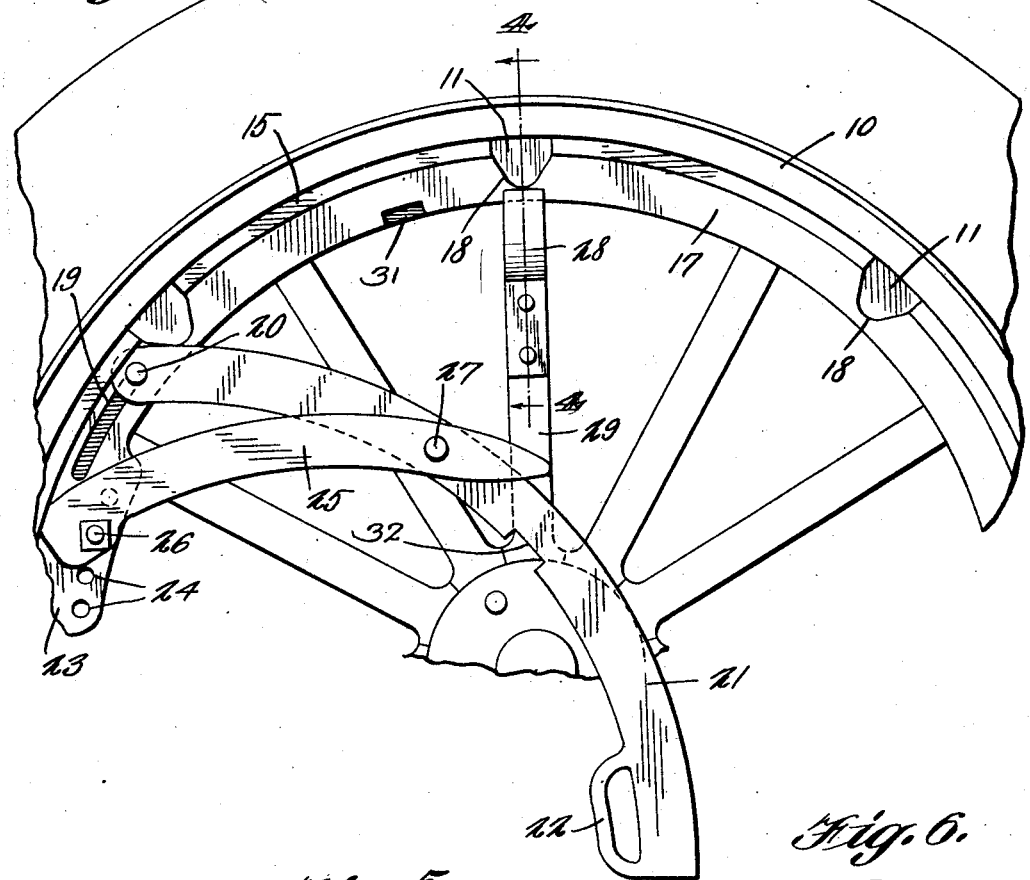

Patented Nov. 16, 1926.

1,607,454

UNITED STATES PATENT OFFICE.

WILLIAM P. GARRETSON, OF VIRGINIA, MINNESOTA.

RIM AND LOCK.

Application filed March 16, 1925. Serial No. 16,032.

This invention relates to improvements in combined rims and lock and contemplates the provision of means adapted for sliding movement upon the outer side of the tire rim in order that the same may be easily turned to slip the tire rim on and off the felly easily and more readily than in the usual and ordinary type of demountable rims having lugs.

Another object of the invention is the provision of a novel form of tire rim which closely resembles the clincher type of rim and includes a plurality of lugs extending from the inner sides thereof and at spaced intervals thereon and adapted to snugly fit within correspondingly shaped recesses provided in the outer side of the felly in order that the same may be held against circumferential movement upon the felly.

A further object of the invention contemplates the use of a holding rim adapted for circumferential movement upon a vehicle wheel for registering a plurality of openings provided in the outer periphery thereof with recessed portions similarly provided upon the adjacent side of the wheel felly, which when registered are adapted to receive lug members carried upon the inner circumference of a tire rim.

With the above and other objects in view, the invention further includes the following novel features and details of construction, to be hereinafter more fully described, illustrated in the accompanying drawings and pointed out in the appended claims.

In the drawings:—

Figure 1 is a side elevation of a tire wheel, rim and tire therefor showing the rim held thereon by the novel form of locking means.

Figure 2 is a side elevation of a portion of the rim and tire with the holding rim reduced and the openings provided in the outer periphery thereof in direct registration with the recesses provided in the inner side of the felly and showing the lugs provided upon the inner portion of the tire rim about to be removed therefrom.

Figure 3 is a section taken on line 3—3 of Figure 1.

Figure 4 is a similar view taken on line 4—4 of Figure 2.

Figures 5 and 6 are detailed perspectives of the inner sides of straight side and clincher tire rims showing the lug members extending therefrom.

Referring to the drawings in detail, whereas in like characters of reference denote corresponding parts, the reference character 10 indicates a split straight side tire rim. Said rim provides a plurality of lug members 11 arranged at spaced intervals upon the inner circumference thereof, the purpose of which will be readily apparent. The felly 12, of the wheel as illustrated, carries upon the outer periphery thereof a wheel rim 13, having its inner side edge upwardly inclined, as indicated at 14 to engage the corresponding side of the tire rim to properly seat the same and to prevent lateral movement in one direction. The outer side edge of the wheel rim extends an appreciable distance beyond the outer side of the felly 12 to provide an inwardly extending annular flange portion 15. The felly 12 and wheel rim 13 are provided with registering recessed portions 16 within which are positioned the lugs 11 carried by the rim 10 in order that independent circumferential movement of said rim upon the felly will be prevented.

To prevent lateral movement of the tire rim upon the felly 12 and wheel rim 13, in an opposite direction, I provide a rotatable rim member 17 which includes a plurality of notched portions 18 arranged at spaced intervals upon the outer periphery thereof and adapted to selectively register with the recesses 16. As illustrated in Figures 3 and 4 of the drawings, the rim member 17 is disposed between the raceway defined by the inwardly extending flange portion 15 of the wheel 13 and the outer side of the felly 12, said rim member 17 providing at an appropriate point thereof an arcuate shaped slot 19 adapted to receive therein a pivot pin 20 carried upon the outer side edge of the felly. A correspondingly shaped operating lever 21 is pivotally mounted upon said pin and upon the outer side of the rim member 17. Said lever includes a handle portion 22 upon the inner side thereof to permit the same to be easily swung upon the pivot pin 20. An enlarged portion 23 formed upon the inner circumference of the rim member 17 and adjacent the arcuate shaped slot 19 provides a plurality of spaced openings 24 therein for pivotally mounting an auxiliary arm 25 upon the pivot pin 26 which may be carried within any one of the openings 24, in order that the thrust and movement of the rim member within the raceway may be regulated as desired. A spring locking member 28 carried upon one of the spokes 29 of the wheel provides an inwardly offset portion 30 upon its outer end adapted to be fitted within registering cutout portions 31 and 32 provided upon the inner sides of the rim member 17 and operating lever 32 and to serve the twofold purpose of holding the operating lever 21 within the raceway and to prevent independent and accidental circumferential movement of both. It will thus be noted that the tire rim is rigidly held against lateral movement in both directions.

As illustrated in Figures 5 and 6 of the drawings both straight side and clincher types of rims may be used.

The invention is susceptible of various changes in its form, proportions and minor details of construction and the right is herein reserved to make such changes as properly fall within the scope of the appended claims.

Having thus described my invention what is claimed is:—

1. In combination with a tire rim and lock, a felly having a wheel rim mounted upon the periphery thereof, the wheel rim providing an outwardly extending flange portion upon one side edge thereof, an inwardly extending annular flange carried upon the opposed edge of the rim and disposed in spaced relation to the adjacent side edge of the felly, said felly providing a plurality of recessed portions within its outer periphery and adjacent the aforementioned side edge, the tire rim carrying lug members adapted to be seated within the recessed portions of the felly, a rotatable locking rim having notched portions within its outer periphery and adapted for selective registration with the recesses when moved circumferentially of the felly within the inclosure defined by the annular flange, said locking rim having longitudinal slotted portion for sliding movement upon a pivot pin carried by the felly, an operating lever pivotally secured to the free end of the pivot pin, and an auxiliary arm pivotally secured to the locking rim and lever whereby the locking rim may be partially rotated upon the edge of the felly in order to selectively register the notched portions with the recesses whereby the tire rim may be locked upon one side while the outer flange portion of the wheel rim will prevent displacement of the tire rim in an opposite direction.

2. In combination with a rim and lock, a felly carrying a wheel rim upon the outer periphery thereof, one side edge of the wheel rim providing an outwardly extending annular flange, the opposed edge therefor defining an inwardly extending annular flange disposed in slightly spaced relation to one side edge of the felly, said felly having a plurality of recesses provided upon and adjacent the outer side edge thereof and registering with slotted portions provided in the aforementioned rim, a tire rim supported upon the wheel rim and having a plurality of lug members extending from the inner side thereof and at spaced intervals thereon and adapted to be received within the recesses in the felly and slotted portions in the wheel rim, a rotatable locking rim having a plurality of notched portions arranged upon the outer periphery thereof and adapted for selective registration with the recesses of the felly when rotated between the inwardly extending annular flange of the wheel rim and adjacent side edge of the felly, said rotatable locking rim having a longitudinal slot therein through which a pivot pin protrudes carried upon the aforementioned side edge of the felly, an operating lever pivotally mounted upon the free end of the pivot pin, and an auxiliary arm having one end pivoted correspondingly secured to the lever whereby the rim member may be rotated upon the outer face of the felly and selectively register the notched portions thereon with the recesses in the felly, and spring means carried by the wheel and engaging the lever to hold the same in a locked position in order that the tire rim may be held against displacement.

In testimony whereof I affix my signature.

WILLIAM P. GARRETSON.